United States Patent [19]
Lucas et al.

[11] Patent Number: 5,824,894
[45] Date of Patent: Oct. 20, 1998

[54] MASS FLOWMETER AND LAMINAR FLOW ELEMENTS FOR USE THEREIN

[75] Inventors: Paul D. Lucas, Melrose, Mass.; Frederick J. Luft, Nashua, N.H.; Ting Huang, Andover, Mass.

[73] Assignee: MKS Instruments, Inc., Andover, Mass.

[21] Appl. No.: 852,430

[22] Filed: May 7, 1997

[51] Int. Cl.$^6$ .................................................. G01F 1/68
[52] U.S. Cl. ................................................ 73/202.5
[58] Field of Search ............................................ 73/202.5

[56] References Cited

U.S. PATENT DOCUMENTS

| | | | |
|---|---|---|---|
| 4,679,585 | 7/1987 | Ewing | 137/486 |
| 5,142,907 | 9/1992 | Hinkle | 73/204.12 |
| 5,297,427 | 3/1994 | Shambayati | 73/203 |
| 5,332,005 | 7/1994 | Baan | 138/43 |
| 5,445,035 | 8/1995 | Delajoud | 73/861.52 |
| 5,461,913 | 10/1995 | Hinkle et al. | 73/204.25 |

*Primary Examiner*—Richard Chilcot
*Assistant Examiner*—Jewel Thompson
*Attorney, Agent, or Firm*—Lappin & Kusmer LLP

[57] ABSTRACT

The disclosed mass flowmeter includes a section defining a passageway and a laminar flow element disposed within the passageway so as to define a laminar flow channel within the passageway. The maximum cross sectional dimension of the laminar flow element is smaller than the maximum cross sectional dimension of the passageway. In one embodiment the flowmeter includes a device for mounting the laminar flow element within the passageway so that the laminar flow element contacts at least a portion of an inner surface of the passageway so that various sized laminar flow elements can easily and reliably be substituted for one another so as to select the mass flow rate through the channel. In a second embodiment the laminar flow element includes two support segments which are fitted within the passageway and support a central segment which defines within the passageway the laminar flow channel. In the latter embodiment the support segments can be fixed within the passageway in various ways, including providing the support segments as end segments and forming end slots in the end support segments so that wedging pieces, in the form of balls or pins, for example, can be inserted so as to spread the slotted portion of each end segment apart so as to hold the laminar flow element firmly in place. In another embodiment the position of at least a portion of the laminar flow element is adjustable between one of two positions so that the cross sectional shape of the channel can be modified so as to modify the flow rate through the channel.

28 Claims, 11 Drawing Sheets

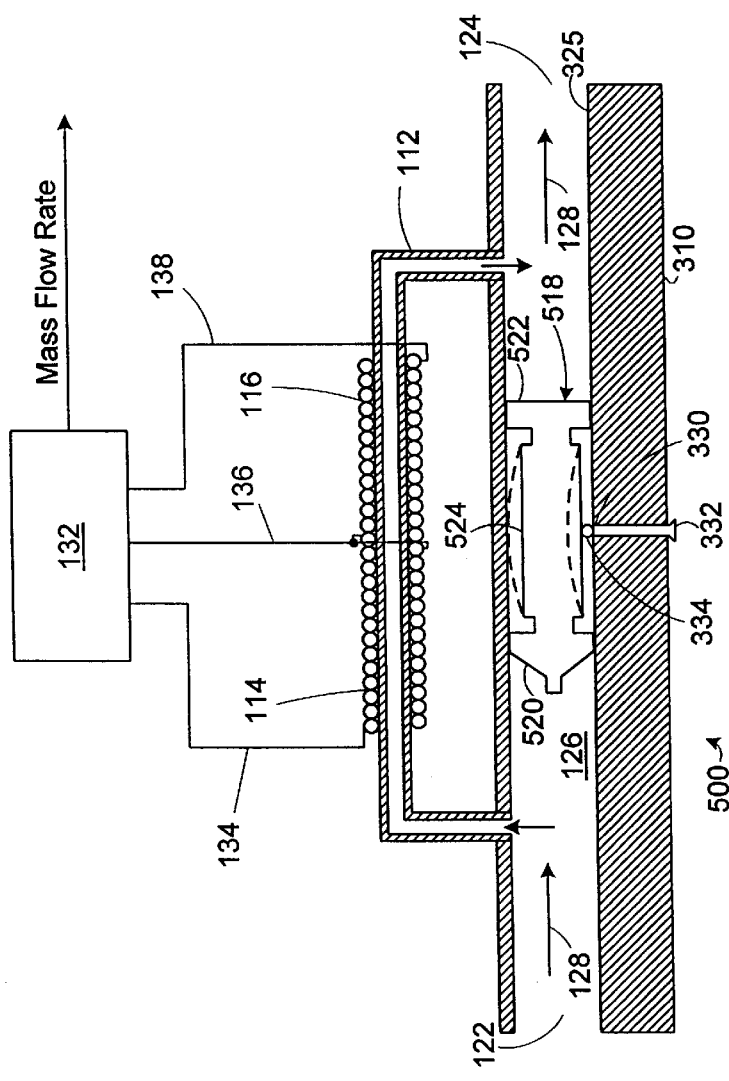
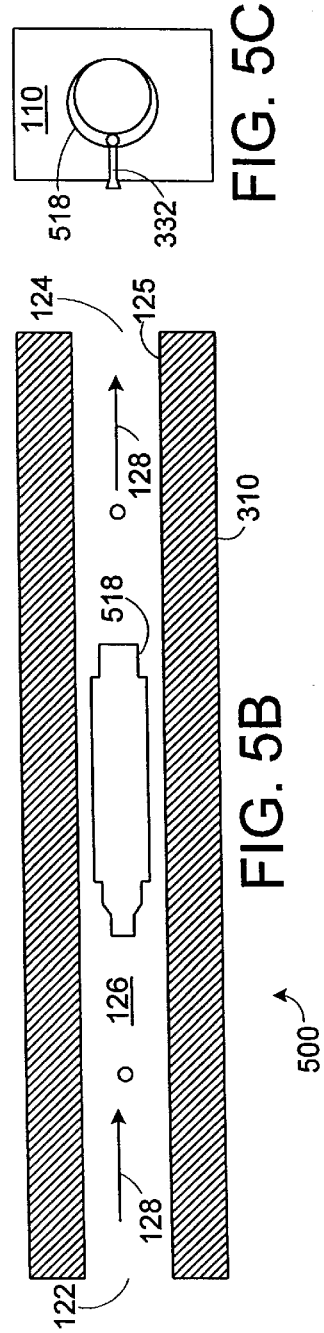

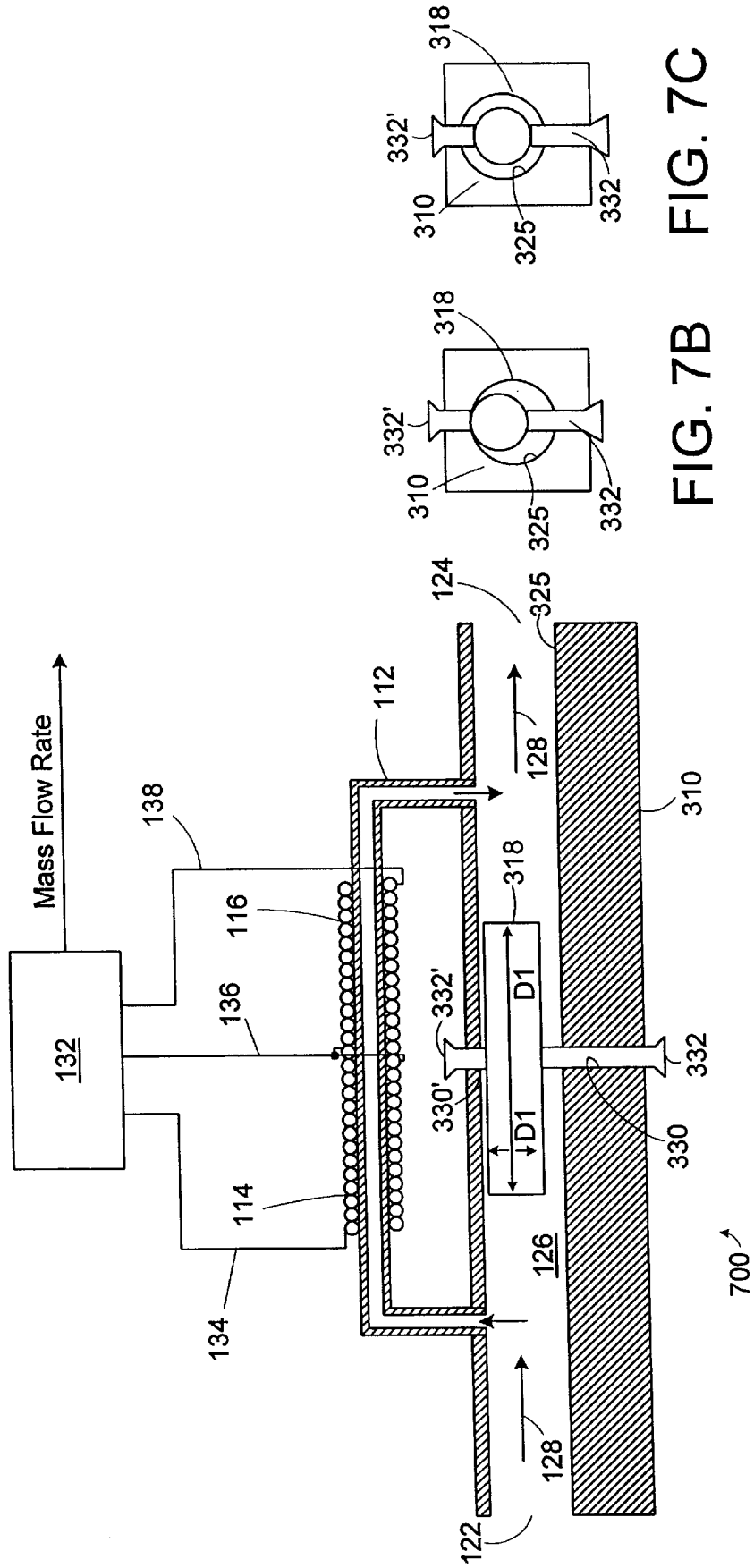

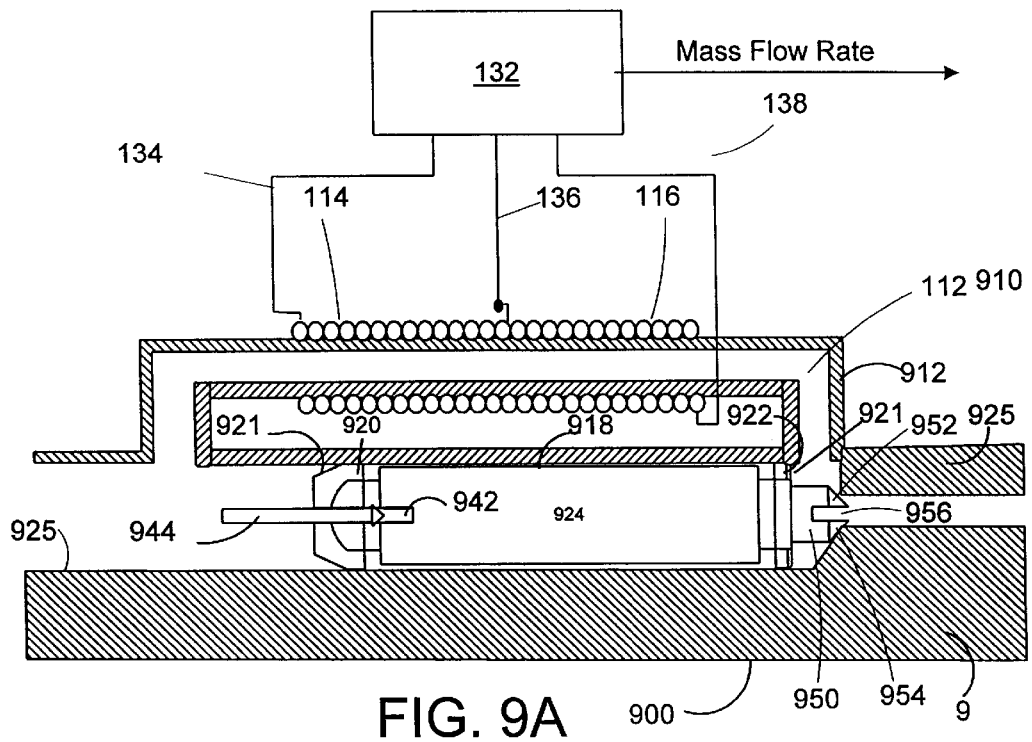
FIG. 9A
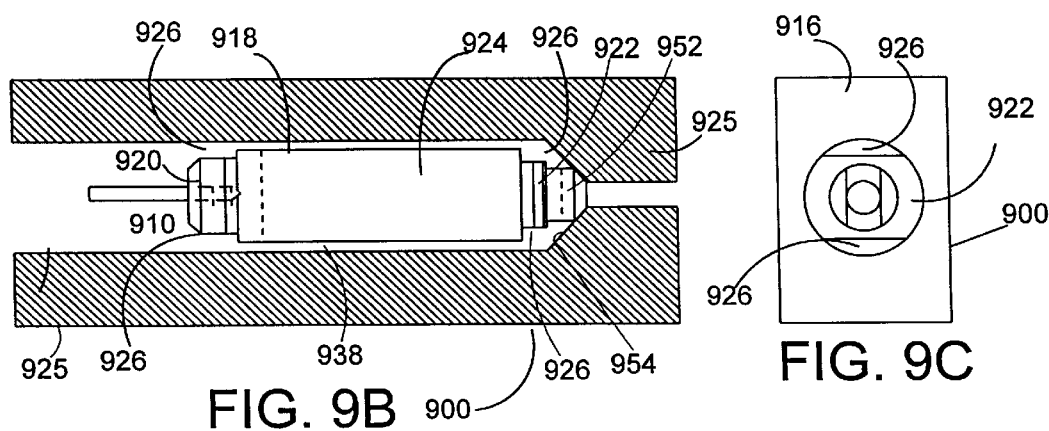
FIG. 9B
FIG. 9C

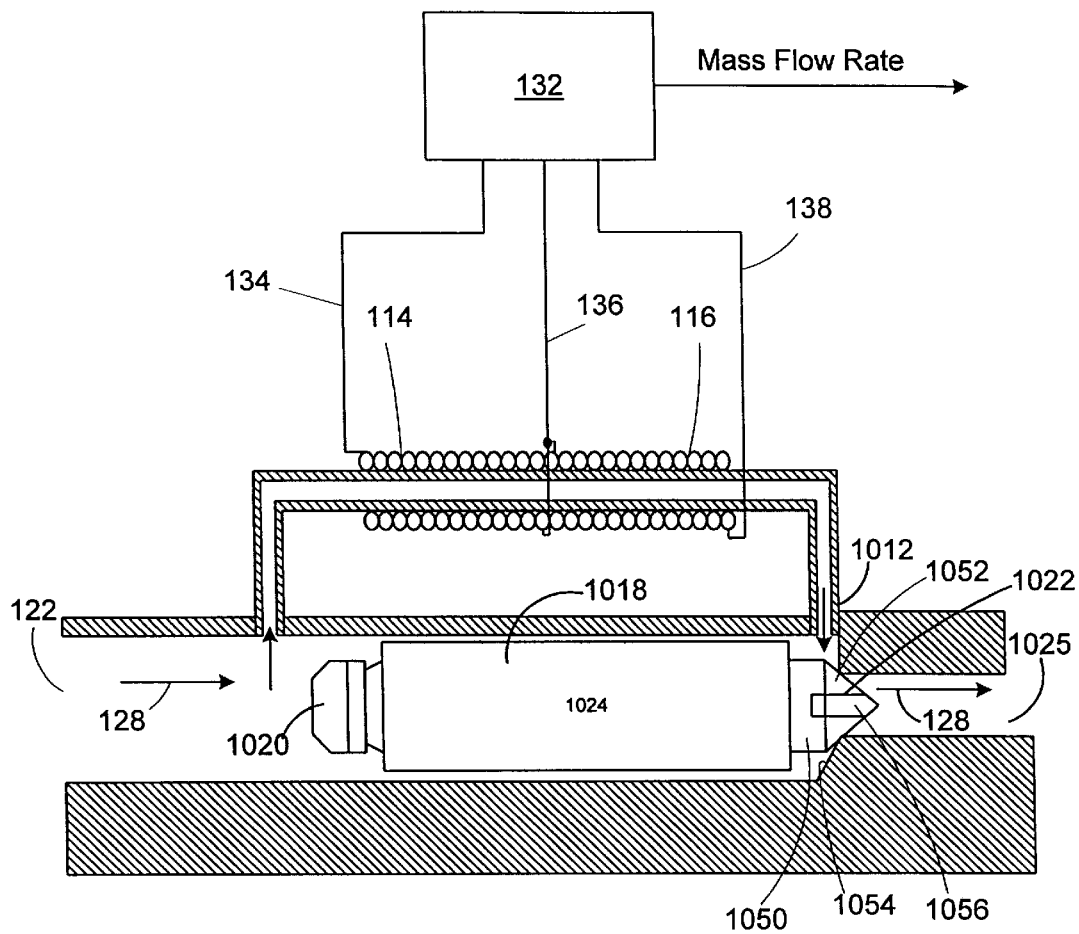
FIG. 10A
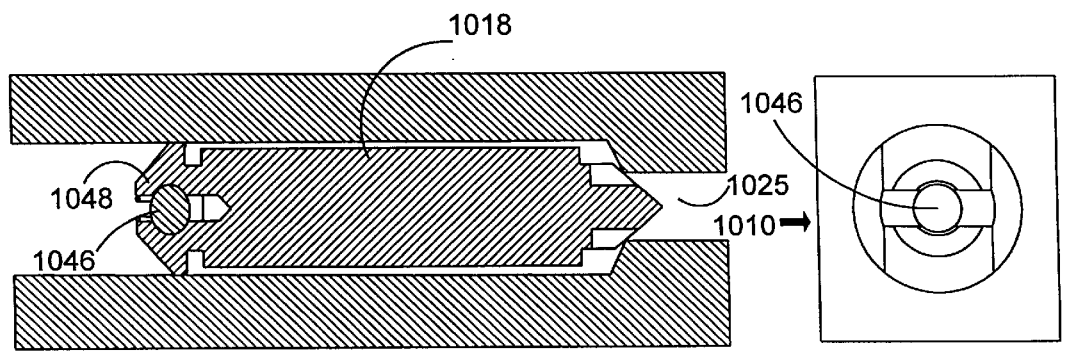
FIG. 10B
FIG. 10C

MASS FLOWMETER AND LAMINAR FLOW ELEMENTS FOR USE THEREIN

FIELD OF THE INVENTION

The present invention relates generally to mass flowmeters. More particularly, the invention relates to an improved mass flowmeter and laminar flow elements (LFEs) for use therein.

BACKGROUND OF THE INVENTION

FIG. 1 shows one prior art mass flowmeter 100, which includes a bypass section or flow body 110, a sensor tube 112, a laminar flow element (LFE) 118 and means for sensing the mass flow through the sensor tube 112. Bypass section 110 is typically (1) formed as a block shaped element, and (2) provided with a fluid flow passageway 125 that extends from an input port 122 to an output port 124 so that a fluid 126 may flow from the input port to the output port in a downstream direction indicated by arrows 128. LFE 118 is disposed within passageway 125 between input port 122 and output port 124 for restricting the flow of fluid 126 through the passageway. An upstream end of sensor tube 112 is coupled to the passageway 125 of bypass section 110 so as to be in fluid communication with the passageway 125 between input port 122 and LFE 118. Similarly, a downstream end of sensor tube 112 is coupled in fluid communication with the passageway 125 of bypass section 110 between LFE 118 and output port 124. A fixed portion of the total mass of fluid flowing from the input port 122 to the output port 124 flows through sensor tube 112. The internal cross-sectional diameter of sensor tube 112 is typically (but not necessarily) of capillary dimensions, and is fabricated from material characterized by a relatively high thermal conductivity (e.g., steel). As fluid flows from the input port 122 to the output port 124, a portion of the fluid flows through sensor tube 112 and the remaining fluid flows through LFE 118. The ratio of the mass of fluid flowing through sensor tube 112 to the total mass of fluid flowing from the input port 122 to the output port 124 is commonly referred to as the "splitting ratio". The splitting ratio is determined by the geometries of passageway 125, sensor tube 112, and LFE 118. Ideally, the splitting ratio remains constant over the entire range of mass flow rates that flowmeter 100 is used to measure. However, in practice the splitting ratio typically varies, at least slightly, according to a function of the rate of mass flow over the measurable range.

The means for actually sensing and measuring the rate of mass flow through the sensor tube in the prior art embodiments described herein, as well as in all of the embodiments of the present invention, can be any arrangement for accomplishing that function. In the embodiment shown in FIG. 1, the means for sensing and measuring the rate of mass flow includes an upstream heater coil 114 and a downstream heater coil 116. Each of the heater coils 114, 116 includes a thermally sensitive resistive conductor that is tightly wound around a respective portion of sensor tube 112. Downstream heater coil 116 is disposed downstream of heater coil 114. The coils 114, 116 abut one another, or are separated by a relatively small gap for manufacturing convenience, and are electrically connected preferably at a node at or near the center of the tube 112. As shown, flowmeter 100 also includes an electronic measuring circuit 132. The upstream end of heater coil 114 is electrically connected to circuit 132 via a conductor 134, the node electrically connecting the downstream end of heater coil 114 and the upstream end of heater coil 116 is electrically connected to circuit 132 via a conductor 136, and the downstream end of heater coil 116 is electrically connected to circuit 132 via a conductor 138. Each heater coil provides an electrical resistance that varies according to a function of the heater coil's temperature, and the temperature of each heater coil varies according to a function of the electrical current flowing through its resistive conductor. Preferably, the resistances of the coils are matched as a function of temperature, i.e., the resistances and temperature coefficients of the coils are the same. For convenience of illustration, the conductors of heater coils 114, 116 are not drawn to scale, and the diameter of these conductors is typically much smaller, relative to the sensor tube 112, than is depicted in the drawings.

In operation, fluid 126 flows from the input port 122 to the output port 124 and a portion of the fluid flows in passageway 125 through restrictive LFE 118. The remaining fluid flows through sensor tube 112. Circuit 132 preferably includes a constant current source for providing a current to flow through heater coils 114, 116, which in the absence of fluid flow through tube 112, are heated to the same initial temperature above the expected temperature of fluid 126. At the initial temperature heater coils 114, 116 generate and apply heat to sensor tube 112, as well as to the fluid 126 flowing through sensor tube 112 when fluid flows through the tube. When fluid 126 flows through the sensor tube 112, the flow of fluid has a cooling effect on coils 114, 116 and lowers their temperature as a function of the mass flow. The flowing fluid cools coil 114 more than coil 116 because coil 114 is disposed upstream from the coil 116, i.e., more heat will be added to the fluid as it passes through the upstream coil 114 than when it passes through the downstream coil 116 since the heating of the fluid by the upstream coil causes the fluid to be at a higher temperature when it enters the downstream coil. Circuit 132 measures the mass flow rate of fluid flowing through sensor tube 112 by measuring the difference in temperature of the two coils, preferably by measuring the differences in resistances between the two coils. Circuit 132 generates a Mass Flow Rate signal representative of the total mass of fluid 126 flowing from the input port 122 to the output port 124 as a function of the measured difference in resistances (and thus measured temperatures) of coils 114 and 116 and as a function of the splitting ratio. Circuit 132 also compensates for any flow dependent variations and/or non-linearities in the splitting ratio when generating the Mass Flow Rate signal. U.S. Pat. No. 5,461,913, issued to Hinkle et al. on Oct. 31, 1995, which is assigned to the present assignee, discloses one form of the measuring circuit 132 that may be used with a two coil sensing device.

It should be appreciated that other arrangements are known for measuring the rate at which the mass of a fluid flows through the sensor tube. For example, U.S. Pat. No. 5,142,907 issued to Hinkle on Sep. 1, 1992 describes a one coil sensing device and a suitable measuring circuit, while U.S. Pat. No. 4,679,585 issued to Ewing on Jul. 14, 1987 describes a three coils design and suitable measuring circuit, both patents being assigned to the present assignee. In addition, other types of mass flowmeters are known, such as pressure based flowmeters, as will be more evident in connection with the description of FIG. 11, which describes such a flowmeter modified in accordance with the principles of the present invention.

The splitting ratio of flowmeter 100 may be selected by selecting an appropriate LFE 118. For any particular LFE 118 (i.e., for any particular splitting ratio), flowmeter 100 is only suited for measuring mass flow rates that lie within a predetermined range. Measurement of the flow rate is only accurate if the fluid flow past the LFE is laminar and flow past the LFE will only be laminar within a predetermined range. Attempts to measure flow rates exceeding the range of a particular LFE require fluid pressures sufficient to create turbulent flow in passageway 125, and turbulent flow alters the splitting ratio and thereby detrimentally affects the accuracy of flowmeter 100. Attempts to measure flow rates below the range of a particular LFE result in insufficient flow rates through sensor tube 112 for generating an accurately measurable difference in resistances between the two coils 114, 116. However, flowmeter 100, initially designed with a particular LFE 118 in order to measure a particular range of mass flow rates, can be adapted to measure a different range of mass flow rates simply by using a LFE 118 with different flow characteristics so as to adjust the splitting ratio appropriately. In practice, therefore, it is desirable to manufacture several different types of LFE's for use in a common flowmeter, each type being characterized by a particular and different splitting ratio. A flowmeter 100 may then be modified for measuring a particular range of mass flow rates simply by mounting a LFE designed for the desired flow rate within bypass section 110. However, for mass production of a particular flowmeter, it is desirable for all LFEs designed for the same range of flow rates to reliably provide the same splitting ratio when mounted in any of the mass produced flowmeters. Any two flowmeters identically constructed with the same type of LFE should ideally perform identically, and any variations in the splitting ratios provided by those LFEs will cause the performance of the flowmeters to differ. There is therefore a need for producing a mass flowmeter in which the splitting ratio can be easily, predictably and repeatedly set and subsequently changed as desired. However, this is not necessarily the case with the prior art device shown in FIG. 1.

As illustrated in FIG. 1, LFE 118 is a cylindrical rod defining one or more helical grooves or threads 140 that are cut in the outer cylindrical surface of the rod. The splitting ratio provided by LFE 118 is a function of the size and number of the helical grooves 140, so different types of LFEs may be produced simply by varying the size and number of the grooves. However, in practice it is extremely difficult to precisely form the grooves 140 with high tolerances, and it is therefore difficult to produce large quantities of such LFEs in a predictable or repeatable fashion so that all provide substantially the same splitting ratio when used in a laminar flowmeter.

U.S. Pat. No. 5,445,035 discloses a LFE comprising a cylindrical rod characterized by an outer diameter that is less than the inner diameter of the bypass section. The LFE is suspended inside and coaxial with the passageway of the bypass section by a set of screws so as to define a cylindrical channel between the outer cylindrical surface of the LFE and the inner surface of the passageway of the bypass section through which fluid may flow. Since this LFE has a simple cylindrical shape (and no grooves) it may be reliably and relatively cheaply manufactured in large quantities. However, this LFE is disadvantageous because the screws used to support the LFE inside the passageway of the bypass section, and their adjustment, are mechanically complex. Further, the splitting ratio provided by such an LFE is strongly dependent on the uniformity of the radial thickness of the cylindrical flow channel (i.e., the alignment between the cylindrical axis of the LFE and the cylindrical axis of the bypass passageway). As is described generally in *VISCOUS FLUID FLOW* (Frank M. White, McGraw-Hill, Inc. 1974, pp. 123–128), precise positioning to achieve uniformity of radial thickness of the channel is important since the mass flow through a channel created by a "fully displaced" LFE (when the LFE is in contact with the inner surface of the passageway) is two and one half times greater than the mass flow through a correspondingly sized (i.e., using the same elements) channel created by a "coaxially aligned" LFE (where the cylindrical axis of the LFE is coaxial with the cylindrical axis of the passageway, and the radial thickness of the channel in between is uniform). So any variation from the coaxial alignment of the cylindrical LFE relative to the passageway of the bypass section caused by misalignment of the LFE will alter the performance of the flowmeter.

FIGS. 2A, 2B and 2C show another prior art mass flowmeter 200. Flowmeter 200, which is sold by the assignee of the present invention, is similar to flowmeter 100 (shown in FIG. 1), however, flowmeter 200 is constructed using LFE 218 rather than LFE 118. LFE 218 is mounted in bypass section 110. LFE 218 is fabricated from a substantially fluid impermeable material such as steel. LFE 218 includes two end segments 220, 222 that are joined preferably together by and at opposite ends of a central segment 224 to form a one-piece (integral or monolithic) construction. As shown in FIGS. 2A and 2C, the radial dimensions of each of the end segments 220, 222 are such that portions 221 of end segments 220, 222 contact the inner wall of passageway 125 of bypass section 110 and hold LFE 218 stationary with respect to bypass section 110. As shown in FIGS. 2B and 2C, the outer surfaces of the end segments 220, 222 are formed so that they do not contact the entire circumference of the inner wall of passageway 125, but leave a pair of diametrically opposed gaps 226 between portions of end segments 220, 222 and the inner wall of passageway 125 so that fluid can pass therebetween. Central segment 224 is formed in the shape of a right angled cylinder, with the outer diameter of central segment 224 sufficiently small so as to provide a cylindrical channel 228 of uniform radial thickness (i.e., the central segment and passageway are coaxially aligned) between central segment 224 and inner wall of passageway 125 when the LFE 218 is positioned in bypass section 110. The gaps 226 between end segments 220, 222 and inner wall of passageway 125 and the passage between central segment 224 and inner wall of passageway 125 provide a fluid flow channel between LFE 218 and the inner wall of passageway 125 that permits laminar flow of fluid from input port 122 to output port 124. The size of the fluid flow channel, and therefore the splitting ratio provided by LFE 218, may be selected by appropriately selecting the outer diameter of central segment 224 (as well as the dimensions of end segments 220, 222) relative to the internal diameter of the passageway 125. Unfortunately, the LFEs are not easily interchangeable.

In the prior art, to insure LFE 218 is rigidly positioned within the bypass section 110, LFE 218 is typically cryogenically fitted into passageway 125 by cooling LFE 218 with, for example, liquid nitrogen to slightly shrink the dimensions of LFE 218, and by heating and thereby slightly expanding bypass section 110 so that LFE 218 may be slidably positioned within passageway 125. Once LFE 218 has been properly positioned within passageway 125, both components are allowed to return to the same (usually ambient) temperature so that LFE 218 expands and bypass section 110 contracts sufficiently and so that portions 221 of end segments 220, 222 contact the inner wall of passageway 125 of section 110, securely and rigidly holding LFE 218 in place.

LFE 218 is advantageous since it can be precisely manufactured to very high tolerances, and therefore, large numbers of LFEs 218 can be produced that all provide substantially the same splitting ratio regardless of which one is mounted in a mass flowmeter. However, under current manufacturing practices this shrink fit approach adds time to the initial assembly time of the flowmeter. Further, LFE 218 can not be easily removed from tube 110 after it has been cryogenically mounted so the assembly tends to be considered permanent. Thus, once LFE 218 has been so mounted there is no way to easily adjust the splitting ratio provided by LFE 218.

Another strategy for producing an adjustable splitting ratio is to use a "modifiable LFE". The splitting ratio provided by a modifiable LFE may be selectively adjusted after the LFE has been mounted within the bypass section. U.S. Pat. No. 5,332,005 discloses a modifiable LFE that includes a fluid permeable, porous steel mesh that may be selectively compressed or expanded to adjust the fluid flow through the mesh. U.S. Pat. No. 5,297,427 describes mechanical devices for inserting obstacles, such as a plate, into the bypass section for selectively adjusting the dimensions of the laminar flow channel. However, these patented devices are disadvantageous because they are mechanically complex.

OBJECTS OF THE INVENTION

It is an object of the present invention to substantially reduce or overcome the above-identified problems of the prior art.

Another object of the present invention is to provide an improved mass flowmeter in which the splitting ratio can be easily adjusted.

And another object of the present invention is to provide an improved flowmeter in which the dimensions of the laminar flow channel through the bypass section can be easily adjusted so as to reliably adjust the splitting ratio of the flowmeter.

And another object of the present invention is to provide an improved LFE that may be easily positioned in and removed from the passageway of a bypass section of a flowmeter.

Still another object of the present invention is to provide an improved flowmeter having an easily removable LFE so that different LFEs may be used to reliably set or adjust the splitting ratio of the flowmeter.

Yet another object of the present invention is to provide an improved LFE that may be inexpensively produced, with identical LFEs providing repeatable performance characteristics when used in a mass flowmeter.

And still another object of the present invention is to provide an improved LFE for use in a mass flowmeter with consistent performance results.

And yet another object of the present invention is to provide an improved mass flowmeter including a LFE and a bypass section, the maximum outer cross sectional dimension of the LFE being smaller than the maximum inner cross sectional dimension of the passageway provided in the bypass section.

And still another object of the present invention is to provide an improved mass flowmeter including a LFE in which at least a portion of the LFE is deliberately disposed in a selected "displaced" position (from the "coaxially aligned" position) within the passageway of a bypass section so as to define a flow channel between the LFE and the inner wall of the passageway of the bypass section correlated to a predetermined splitting ratio of the flowmeter.

And yet another object of the present invention is to provide a cylindrical LFE for use in a cylindrical passageway defined by a bypass section, the LFE being mounted in a fully "displaced" position against the inner wall of the passageway.

And still another object of the present invention is to provide a flowmeter including a LFE disposed within a bypass section for defining a fluid flow channel, and a device for selectively adjusting the dimensions of the fluid flow channel.

SUMMARY OF THE INVENTION

These and other objects are provided by an improved flowmeter. The flowmeter includes a bypass section defining a passageway and a LFE disposed within the passageway for defining a laminar flow channel through which a fluid flows. In accordance with one aspect of the invention, the maximum outer cross sectional dimension of the LFE is smaller than the maximum inner cross sectional dimension of the passageway so that the LFE can be disposed in a selected displaced position within the passageway so as to define a predetermined splitting ratio.

In accordance with another aspect of the present invention, the flowmeter includes a device for mounting the laminar flow element within the passageway so that the laminar flow element contacts at least a portion of an inner surface of the passageway.

In accordance with yet another aspect of the invention, the laminar flow channel through the bypass section has a cross-sectional shape which is defined herein as an "open geometric shape". In the preferred embodiment this open geometric shape is crescent-shaped.

In accordance with still another aspect of the present invention, mounting means are provided for mounting the LFE within a bypass section so that it is securely in place and defines a predictable and repeatable splitting ratio, and yet is easily removable from the bypass section.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein:

FIG. 5A shows a side view, taken partially in cross section and shown partially in schematic form, of another mass flowmeter constructed according to the invention using an improved adjustable LFE;

FIGS. 5B and 5C respectively show a bottom view, taken in cross section, and an end view, of the LFE and bypass section shown in FIG. 5A;

FIG. 7A shows a side view, taken partially in cross section and shown partially in schematic form, of another mass flowmeter constructed according to the invention using an improved adjustable LFE;

FIGS. 7B and 7C show two axial, cross sectional views showing two different positions of the adjustable LFE shown in FIG. 7A relative to the bypass section;

FIG. 9A shows a side view, taken partially in cross section and shown partially in schematic form, of a portion of another mass flowmeter constructed according to the invention using an improved LFE which can be easily mounted and removed from the passageway;

FIGS. 9B and 9C respectively show a bottom view, taken in cross-section, and an end view, of the LFE and bypass section shown in FIG. 9A;

Figure 10A shows a side view, taken partially in cross-section and shown partially in schematic form, of a portion of another mass flowmeter constructed according to the invention using an improved LFE which can be easily mounted and removed from the passageway;

Figures 10B and 10C respectively show a bottom view, taken in cross-section, and an end view, of the LFE and bypass section shown in FIG. 10A.

DETAILED DESCRIPTION OF THE DRAWINGS

Figure 1:
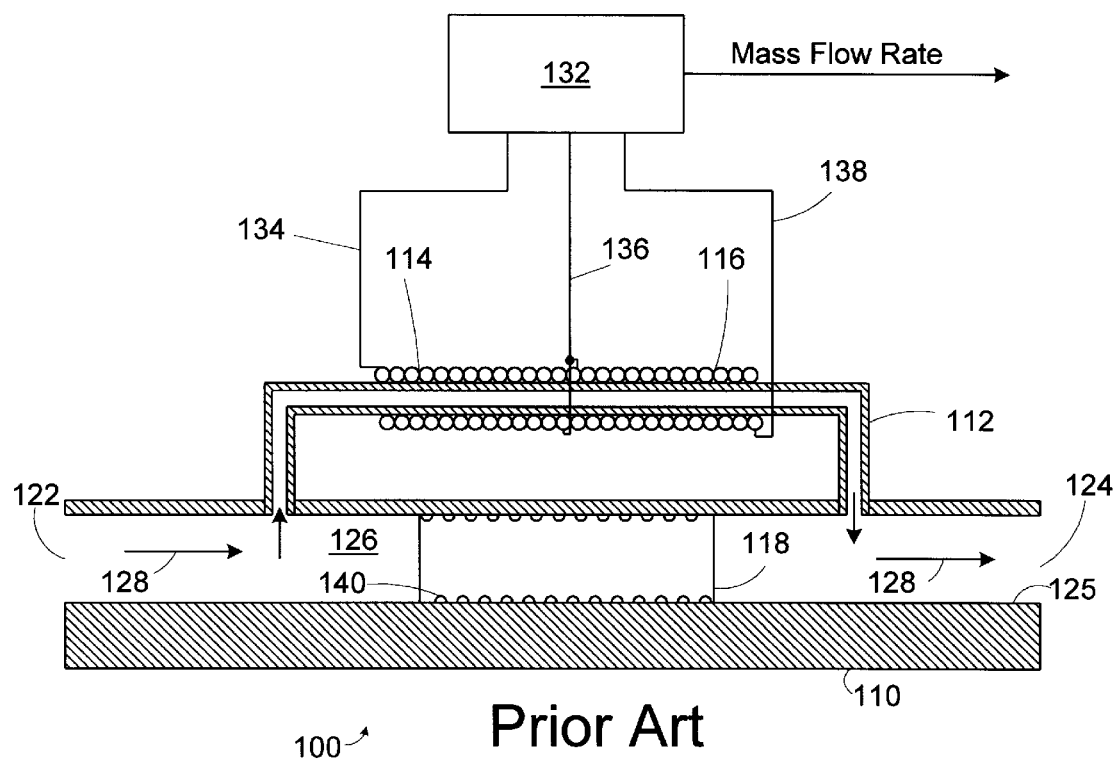
FIG. 1 shows a side view, taken partially in cross section and shown partially in schematic form, of a prior art mass flowmeter.
Figure 3B:
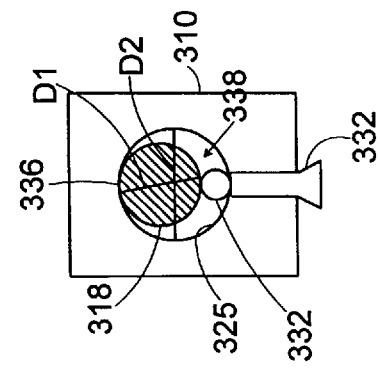
FIG. 3B shows an axial view, taken in cross section, of the LFE and bypass section shown in FIG. 3A.
Figure 3A:
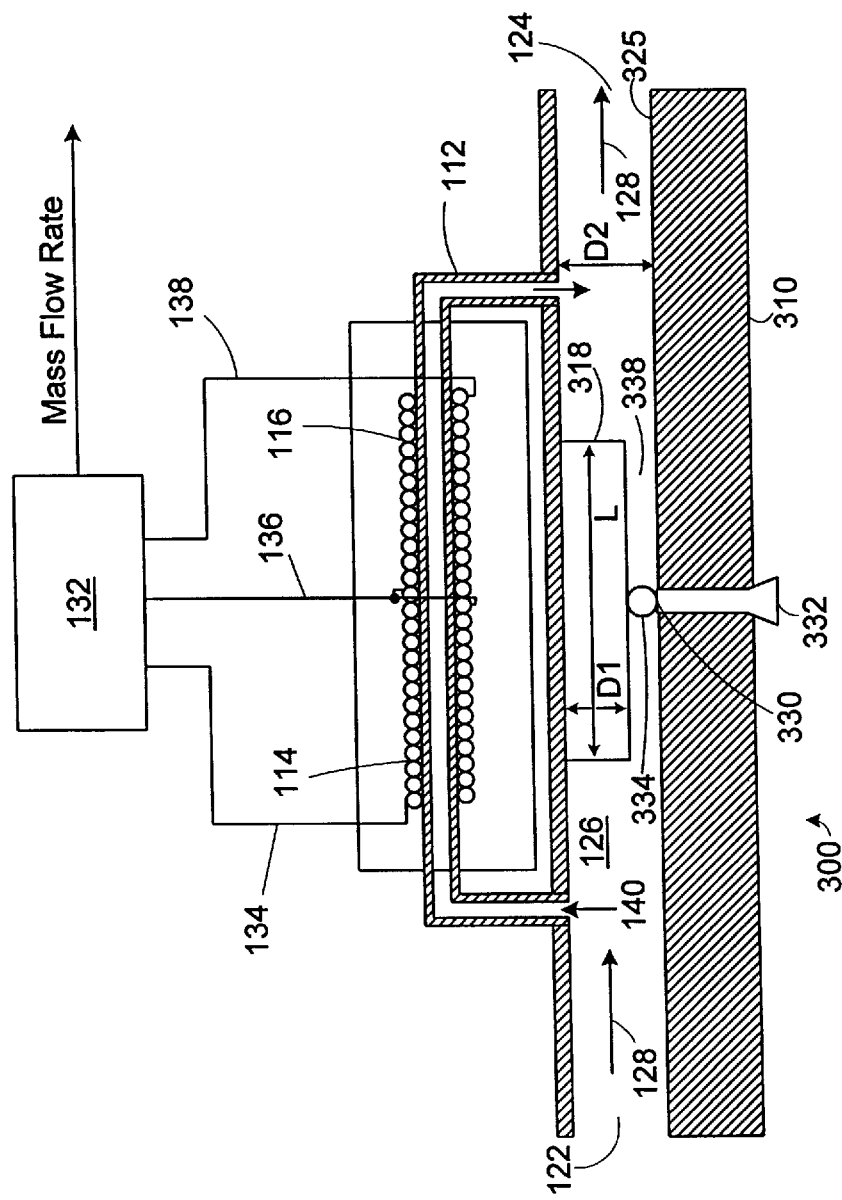
FIG. 3A shows a side view, taken partially in cross section and shown partially in schematic form, of a flowmeter constructed according to the invention using an improved LFE.

FIGS. 3A and 3B show an improved mass flowmeter 300 constructed according to the invention. Flowmeter 300 is shown as being similar to prior art flowmeter 100 (shown in FIG. 1). However, flowmeter 300 is constructed to include improved LFE 318 rather than prior art LFE 118, and use bypass section 310 rather than section 110. Improved LFE 318 is preferably a solid right cylindrical rod and is preferably fabricated from a substantially fluid impermeable material such as steel. The outer diameter D1 of LFE 318 is selected to be smaller than the inner diameter D2 of the passageway 325 of bypass section 310 so that LFE 318 is easy slidably positionable within bypass section 310. Bypass section 310 is shown as being similar to prior art bypass section 110, however, bypass section 310 additionally includes means for adjustably biasing the LFE 318 to a predictable and repeatable displaced position within the passageway. In the preferred embodiment, one or more threaded apertures 330 (one being shown in FIGS. 3A and 3B) are provided through the wall of the passageway 325 of the bypass section for receiving a respective screw 332. Flowmeter 300 additionally preferably includes a ball 334 disposed between LFE 318 and screw 332. LFE 318 is mounted in flowmeter 300 by tightening screw 332. Tightening screw 332 advances ball 334 towards LFE 318 until ball 334 biases LFE 318 against a portion 336 of the inner wall of passageway 325 opposite screw 332 and securely holds LFE 318 substantially stationary relative to bypass section 310. It should be appreciated that other arrangements can be used for biasing the LFE, such as spring elements, so long as the arrangements do not significantly affect laminar flow through the passageway 325. Alternatively, ball 334 may be eliminated and screw 332 may hold LFE 318 in place. Further, screw 332 may be eliminated and a simple seal, or other mechanism may hold ball 332 in place so that it provides sufficient pressure for biasing LFE 318 against the inner wall of passageway 325.

As shown in FIG. 3B, since the cross sectional area of LFE 318 is smaller than the cross sectional area of the passageway provided by bypass section 310, biasing LFE 318 against portion 336 of inner wall of passageway 325 to a fully displaced position creates a fluid flow channel 338 having a cross-sectional shape which is an "open geometric shape", and in particular has a radial cross-sectional shape which is "crescent" shaped, as shown in FIG. 3B, between LFE 318 and inner wall of passageway 325. As used herein, "open geometric shape" means that the radial thickness of the channel is zero at least at one radial point around the axis of the passageway. This is distinguished from a "closed geometric shape" in which the channel has a finite radial thickness completely around the circumference of the passageway.

In accordance with one aspect of the invention, the splitting ratio provided by LFE 318 may be selected simply by selecting an appropriate cross sectional area for LFE 318. Since the outer wall of LFE 318 contacts the inner wall of passageway 325 of bypass section 310, the center cylindrical axis of LFE 318 is maximally displaced from the center cylindrical axis of bypass section 310 and the mounted orientation of LFE 318 is referred to herein as "fully displaced".

Since LFE 318 has a uniform shape (i.e., preferably a solid right cylinder) and does not include any threads, or complex mechanical components, LFE 318 is extremely simple and inexpensive to manufacture. For example, LFE 310 may be produced simply by cutting an appropriate length of wire stock having an appropriate gauge or diameter. Further, since mounting is accomplished simply by biasing LFE 318 against the inner wall of passageway 325 of bypass section 310, it is simple to provide a consistent and proper alignment between LFE 318 and bypass section 310 when producing large mass quantities of flowmeters. LFE 318 thereby eliminates the need for consistently concentrically aligning the LFE and the bypass section, and further eliminates the cumbersome task of the heat shrink placement of the LFE. Still further, extremely simple and inexpensive mechanical arrangements (e.g., screw 332 and ball 334) may be used to easily mount and remove LFE 318. So, LFE 318 provides an extremely simple and inexpensive way to produce large numbers of LFEs that all provide substantially the same splitting ratios. Further, the splitting ratio provided by LFE 318 may be selected simply by selecting an appropriate diameter D1 for LFE 318 and easily replacing one LFE with another.

The length L of the channel 338 (and each of the channels in the alternative embodiments described hereinafter) is preferably selected to be relatively large compared to the differences between the outer diameter ($D_1$) of the LFE and the internal diameter ($D_2$) of the passageway of the bypass section, e.g., $L>>(D_1+D_2)/2$, so that LFE 318 maintains substantially laminar flow through channel 338 over the entire range of mass flows measured by flowmeter 300. For example, for properly developed laminar flow, it is conventional wisdom in the prior art (where the LFE is mounted coaxially within the passageway) to make the ratio of the length of the channel relative to the radial width of the channel on the order of one hundred, although the required minimum ratio is actually lower. As different design shapes are considered herein, the appropriate minimum ratio changes. Because of the off-axis position of the LFE in accordance with one aspect of the invention, when calculating pressure drop and splitting ratios, hydraulic diameter is preferably used to define the dimensions of the channel. Generally, the required minimum ratio of length to hydraulic diameter of the channel is generally lower for the prior art annular-cross-sectional shapes of the passageway, than other shapes suggested by the present invention. However, using conservative design approaches, the minimum length to hydraulic diameter ratio of 100 can be, but need not necessarily be, used in using LFEs designed in accordance with the present invention. LFE 318 therefore provides a substantially constant, flow independent, splitting ratio over a predetermined range and minimizes the need for circuit 132 to provide any linearization corrections.

Figure 4:
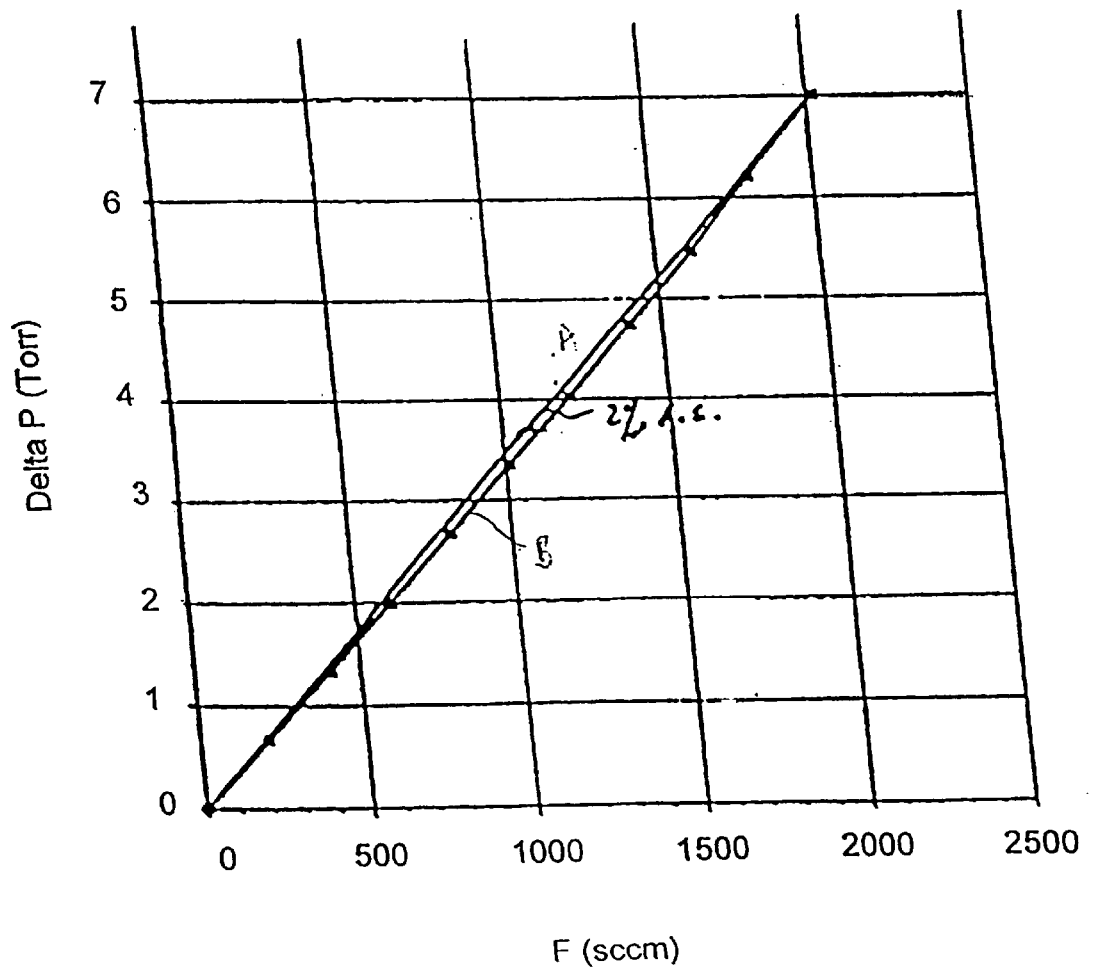
FIG. 4 shows a graph illustrating an example of the measured flow characteristic of the LFE shown in FIG. 3A.

FIG. 4 shows a graph illustrating an example of the measured fluid flow characteristic provided by LFE 318 when mounted in bypass section 310. In FIG. 4, the vertical-axis represents the difference in fluid pressures (measured in Torr) at input port 122 and output port 124, and the horizontal-axis represents mass flow (measured in sccm, or standard cubic centimeters per minute) through bypass section 310. FIG. 4 shows a perfectly linear curve A which illustrates an ideal flow characteristic. FIG. 4 also shows a nearly linear curve B that represents the actual measured flow characteristic provided by an LFE 318 having an outer diameter $D_1$ of the LFE equal to 0.465 inches and a length L equal to 1.3 inches when mounted in a bypass section 310 having an inner diameter $D_2$ equal to 0.475 inches. As shown by FIG. 4, the flow characteristic provided by this apparatus (i.e., LFE 318 and bypass section 310) is within about two percent of a perfectly linear characteristic at its greatest deviation, so the splitting ratio provided by LFE 318 will remain substantially constant over the illustrated range of pressures and flows. This apparatus may be used, for example, to provide a 2000 sccm flowmeter when used in combination with a sensor tube 112 having an inner diameter of 0.012 inches. Clearly, these dimensions and flow rates are illustrative, and can vary.

The dimensions of ball 334 are preferably selected so that the end of screw 332 does not protrude into the channel 338 when LFE 318 is securely mounted within bypass section 310. Ball 334 presents only a minimal obstacle to the fluid flowing through channel 338 and tends to generate little or no turbulent flow. Screw 332 and ball 334 preferably seal aperture 330 so that substantially no fluid escapes bypass section 310 via aperture 330.

Figure 2A:
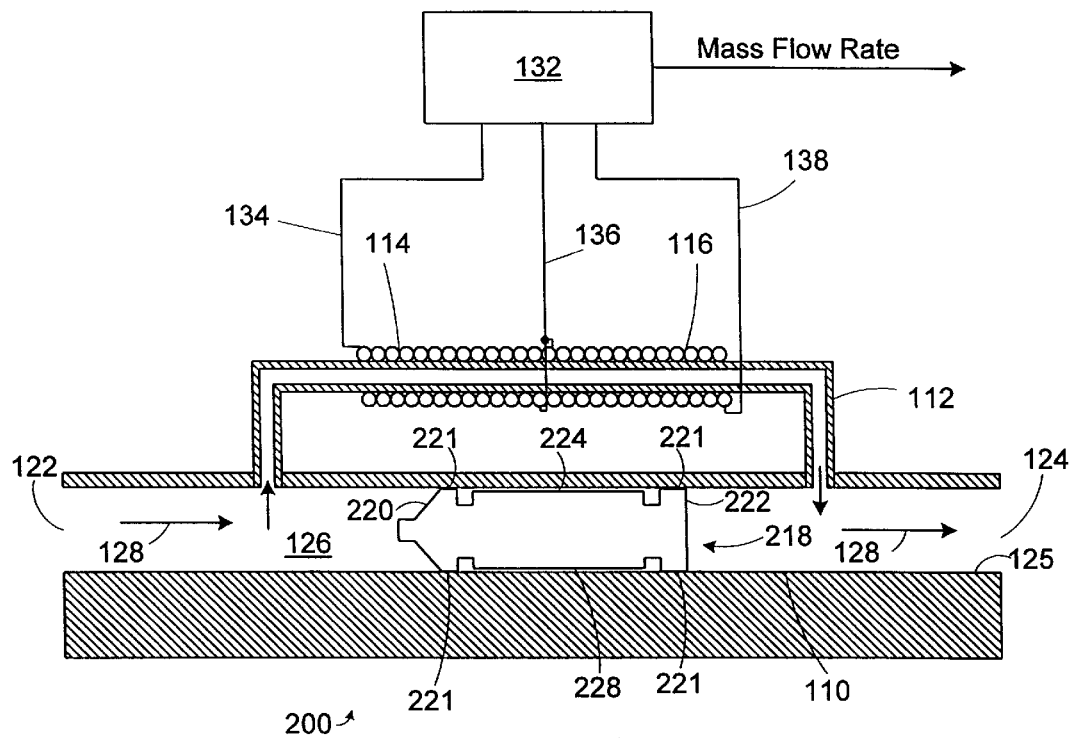
FIGS. 2A shows a side view, taken partially in cross section and shown partially in schematic form, of another prior art mass flowmeter.
Figure 2B:
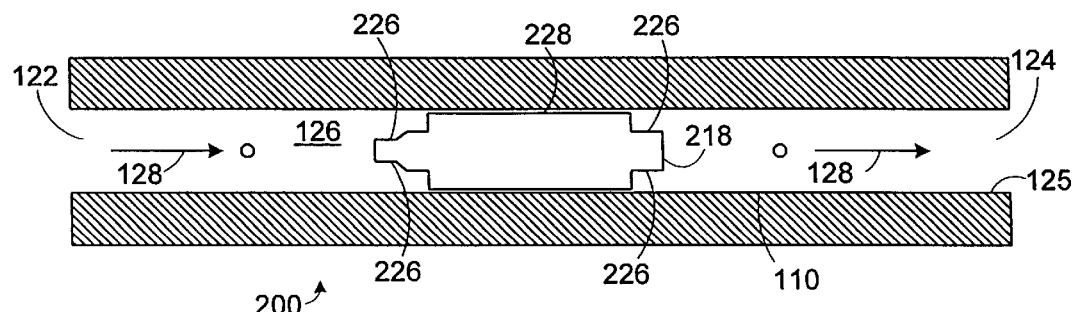
FIGS. 2B and 2C respectively show a bottom view, taken in cross section, and an end view, of the LFE and bypass section shown in FIG. 2A.
Figure 2C:
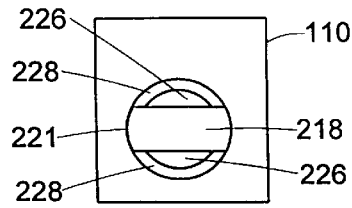

FIGS. 5A, 5B and 5C show a partially sectional front view of another improved flowmeter 500 constructed according to the invention. Flowmeter 500 is similar to flowmeter 300 (shown in FIGS. 3A–3B), however, flowmeter 500 is constructed using adjustable LFE 518 rather than LFE 318. Adjustable LFE 518 preferably is similar to LFE 218 (shown in FIGS. 2A–2C) and includes two end segments 520, 522, and a central segment 524. Further, LFE 518 is preferably fabricated from a substantially fluid impervious material and is of integral or monolithic construction. However, whereas the splitting ratio provided by prior art LFE 218 could not be adjusted after LFE 218 was cryogenically mounted within the bypass section, in improved flowmeter 500 screw 332 and ball 334 provide a mechanism for adjusting the splitting ratio provided by adjustable LFE 518 after LFE 518 has been mounted (cryogenically or otherwise) into bypass section 310. Tightening screw 332 and thereby advancing ball 334 towards LFE 518 bends the central segment 524 away from screw 332 and thereby essentially adjusts the displacement of at least a portion of central segment relative to the inner wall of passageway 325 of bypass section 310. The mass flow through an annular channel may be varied by as much as two and one half times by varying the displacement of the portion of this central segment between a first position wherein the central segment is coaxially aligned with the passageway 325, and a second position wherein at least a portion of the central segment is fully displaced so as to be in contact with the wall of the passageway. So, the splitting ratio provided by LFE 518 may be selectively adjusted between the two extreme positions by tightening or loosening screw 332 a predetermined amount correlated to the desired splitting ratio.

Figure 6:
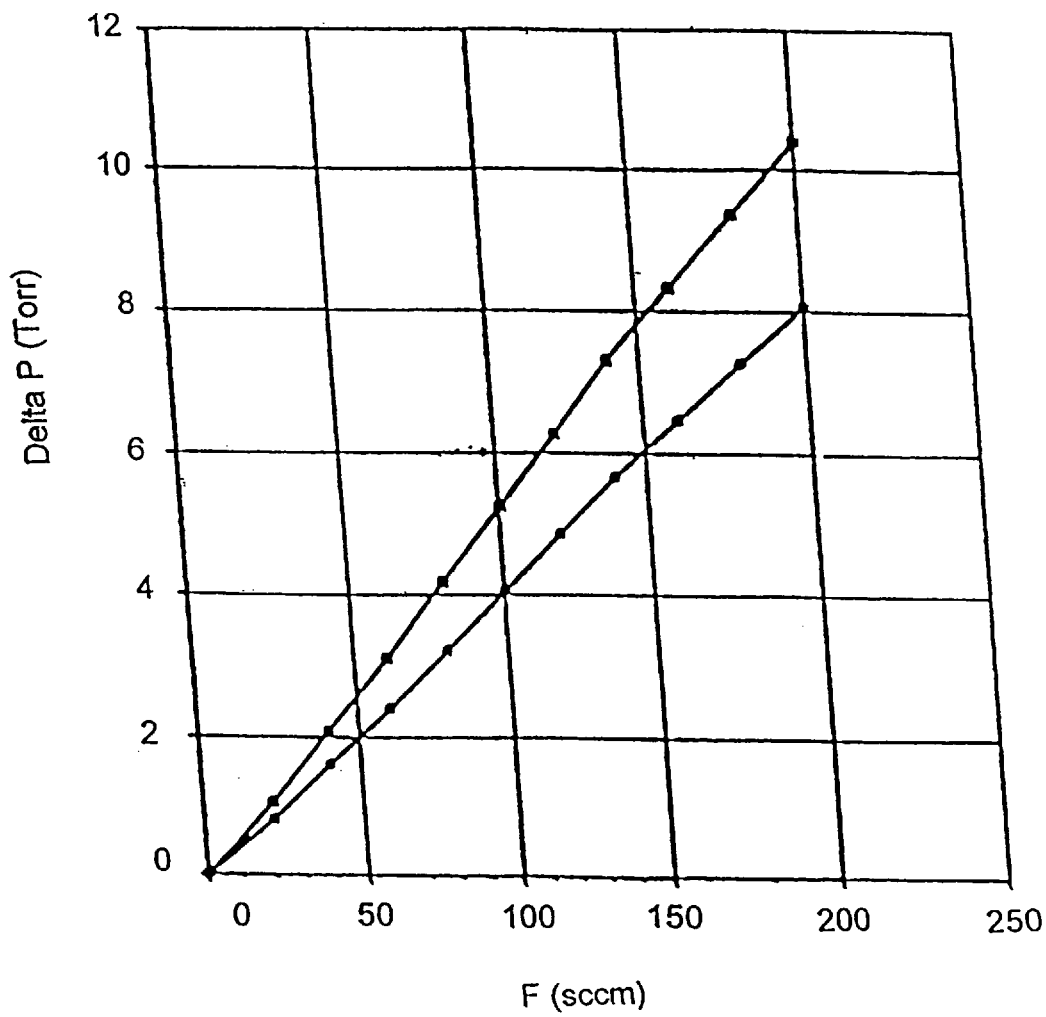
FIG. 6 shows a graph illustrating examples of the adjustable flow characteristic provided by the LFE shown in FIGS. 5A, 5B and 5C.

FIG. 6 shows a graph illustrating the adjustable splitting ratio that may be provided by LFE 518. The vertical axis of FIG. 6 represents the difference in fluid pressures (measured in Torr) at input port 122 and output port 124, and the horizontal axis of FIG. 6 represents mass flow (measured in sccm) through bypass section 310 when adjustable LFE 518 is mounted within bypass section 310. FIG. 6 shows two curves, and each curve describes the experimentally measured flow characteristic provided by adjustable LFE 518 for a different position of screw 332. Each of the two curves is substantially linear showing that LFE 518 provides a substantially constant splitting ratio for the illustrated range of pressures and mass flows. Since screw 332 may be used to adjust the splitting ratio provided by LFE 518 after LFE 518 has been mounted in the passageway of bypass section 310, screw 332 may be used to compensate for any manufacturing defects or variations in LFE 518 that adversely affect the splitting ratio. Thus, use of adjustable LFE 518 may facilitate producing large numbers of flowmeters that all provide substantially the same performance characteristics. Adjustable LFE 518 may of course be used in other contexts as well.

While FIGS. 5A–5C illustrate one embodiment of an adjustable LFE provided in accordance with the principles of the present invention, those skilled in the art will appreciate that many other embodiments of an LFE are embraced within the invention. For example, in the illustrated embodiment of FIGS. 5A–5C, adjustable LFE 518 is of a monolithic or integral construction. In other embodiments, central segment 524 may be resiliently joined to end segments 520, 522 (e.g., by springs) so that segment 524 can be displaced from the coaxial position by a preselected amount and will resiliently and repeatedly return to an original position when screw 332 is loosened to remove or reduce the biasing force applied by ball 334.

In another example, as shown in FIGS. 7A, 7B and 7C, two screws are positioned on diametrically opposite sides of bypass section 310 for controlling the position of an LFE disposed between the screws. Such an LFE may be, for example, in the form of LFE 318 (shown in FIG. 3) or in the form of LFE 518 (shown in FIG. 5) or other forms described herein. FIG. 7A shows a flowmeter 700 constructed according to the invention including such an adjustable LFE. Flowmeter 700 is constructed using bypass section 310 and LFE 318. In addition to defining aperture 330, bypass section 310 also defines aperture 330' diametrically opposite aperture 330. Similarly, in addition to including screw 332, flowmeter 700 also includes a second screw 332' which extends through aperture 330'. The position of screws 332, 332' controls the position, i.e., the amount of displacement, of LFE 318 relative to the passageway 325 of bypass section 310. FIGS. 7B and 7C show two different positions of LFE 318 within bypass section 310. FIG. 7B shows a fully displaced position for LFE 318 in which the LFE 318 contacts a portion of the inner wall of passageway 325. This latter position is of course the same as the position of the LFE in flowmeter 300 (shown in FIGS. 3A–3B). FIG. 7C shows a different position of LFE 318 relative to bypass section 310. In the illustrated position, LFE 318 is not coaxial, nor fully displaced with bypass section 310 (since LFE 318 does not contact inner wall of passageway 325). Although the volume of the fluid flow channel defined by the space between LFE 318 and inner wall of passageway 325 is identical in FIGS. 7B and 7C, the mass flow characteristics for these channels are not identical. Specifically, since the fluid flow channel illustrated in FIG. 7B is more displaced (from the coaxial position) than the channel illustrated in FIG. 7C, the channel illustrated in FIG. 7B provides for increased fluid flow, but flow will remain substantially laminar in both positions.

While the LFEs have been discussed in terms of being biased by one or more screws and balls, those skilled in the art will appreciate that there are many other mechanical arrangements that may be used for mounting and/or adjusting the LFE, and all such arrangements are embraced by the invention. For example, such arrangements include one or more screws and balls, balls alone, springs, pins, levers or other devices.

Alternatively, the LFE may be secured directly to the wall of the passageway of the bypass section, while providing a clear channel. For example, referring to FIG. 3A for illustration purposes, one or more screws 332 can be provided through apertures similar to aperture 332 positioned directly where the LFE contacts the wall of passageway 325. In this arrangement the screw(s) would extend into and secure the LFE in place, and would be disposed, for all practical purposes, outside the channel 338. Under certain circumstances it may be possible to form the bypass section 910 and LFE in its fully displaced position as a single integral device (as for example by extrusion) so long as the materials of the bypass section and LFE are compatible with the fluids passing through the channel. In this situation, the splitting ratio can be changed by substituting one integral bypass section and LFE arrangement for another.

Figure 8A:
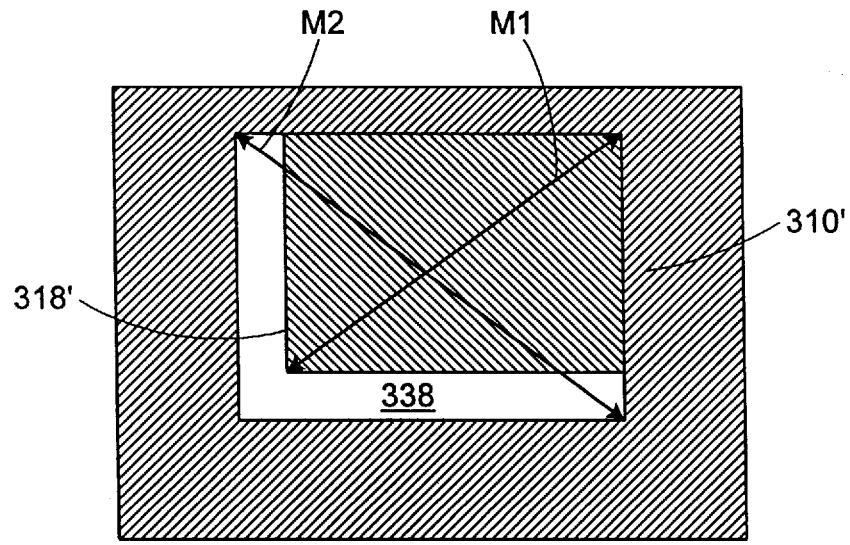
FIG. 8A shows an axial view, in cross section, of a rectangular LFE constructed according to the invention mounted within a rectangular bypass section in accordance with the teachings of the present invention.

Also, while the LFEs 318 and 518 have been described as having a generally cylindrical profile, those skilled in the art will appreciate that the LFE may be characterized by other shapes as well. In general, the invention embraces LFEs characterized by a maximum outer cross sectional dimension that is smaller than the maximum inner cross sectional dimension of the passageway of the bypass section 310. For example, as shown in FIG. 3B, the maximum outer cross sectional dimension of cylindrical LFE 318 is D1, whereas the maximum inner cross sectional dimension of the passageway of the bypass section 310 is D2, D1 being smaller than D2. FIG. 8A shows another embodiment of a LFE constructed according to the invention and of a different shape from that shown with respect to LFEs 318 and 518. Specifically, FIG. 8A shows a LFE 318' in the form of a solid bar having a rectangular radial cross-section and mounted within a passageway of a bypass section 310' also having a rectangular radial cross-section. M1 is the maximum outer cross sectional dimension of LFE 318', M2 is the maximum inner cross sectional dimension of the rectangular passageway defined by bypass section 310', and M1 is smaller than M2. LFE 318' need not be rectangular in cross sectional shape and of course need not be mounted in a rectangular passageway of bypass section 310', and could instead be of a different shape and mounted in passageways having other cross sectional shapes.

FIG. 3A also illustrates LFE 318 as a right cylinder and thus as having a uniform (circular) cross section, meaning that any two axial cross sections of LFE 318, taken at arbitrary locations along the length L of LFE 318, will always be substantially identical. Similarly, FIG. 3A illustrates bypass section 310 as defining a cylindrical passageway having a uniform (circular) cross section. Accordingly, the channel thus formed between the two elements will also have a uniform, crescent-shaped cross-section helping to establish laminar flow. Those skilled in the art will appreciate that the present invention also embraces LFEs that are not characterized by uniform axial cross sections, as well as configurations of LFEs disposed in passageways that may or may not be characterized by uniform radial cross sections.

Figure 8B:
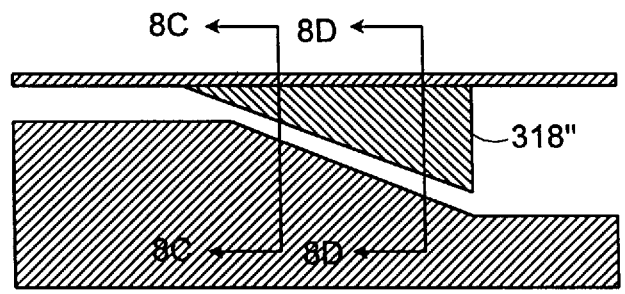
FIG. 8B shows a side view, in cross-section, of a conical LFE constructed according to the invention mounted within a bypass section.
Figure 8C:
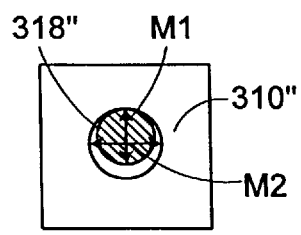
FIGS. 8C and 8D show cross sectional views of the structure shown in FIG. 8B taken along section lines 8C—8C and 8D—8D, respectively, of FIG. 8B.
Figure 8D:
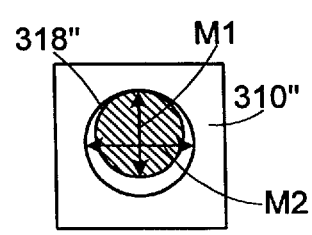

For example, FIGS. 8B, 8C and 8D show a conical LFE 318" constructed according to the invention and mounted within bypass section 310". At every point along the length of conical LFE 318", the cross sectional dimensions of LFE 318" are smaller than the corresponding cross sectional dimensions of bypass section 310". For example, FIGS. 8C and 8D show cross sectional views of LFE 318" and bypass section 310" taken along lines 8C—8C and 8D—8D (as shown in FIG. 5B), respectively. FIGS. 5C and 5D show that at each location along the length of LFE 318", the cross sectional dimension M1 of LFE 318" is smaller than the cross sectional dimension M2 of bypass section 310".

In accordance with yet another aspect of the present invention, means exist for easily mounting and removing LFEs from the passageway of the bypass section. Two embodiments are shown in FIGS. 9A, 9B, 9C and 10A, 10B, 10C. Referring to FIGS. 9A, 9B and 9C, for example, an improved LFE 918 is provided in the bypass section 910 of a flowmeter 900. The LFE 918 is shaped similarly to the LFE shown in FIGS. 2A, 2B and 2C, although it is modified in accordance with the present invention. More specifically, LFE 918 includes two end segments 920, 922 that are preferably provided at opposite ends of a central segment 924. The radially reduced portions of the end segments 920, 922 form gaps 926 (seen in FIG. 9C) between the wall of the passageway 925 and the LFE 918. Preferably, although not necessarily, two diametrically opposed gaps 926 are provided. The maximum outer dimension of the central segment 924 is smaller than the maximum inner dimension of the passageway 925 and this difference in dimensions forms a flow channel between the passageway wall and the central segment wall. The central segment 924 may be designed to be coaxial with the passageway, or displaced from the passageway 925. Although not necessary, a displacing means can adjustably displace at least a portion of the central segment as previously described. Preferably, although not necessarily, the segments form an integral one-piece construction. The maximum outer radial dimension of the portion 921 of the end segment 920 is made slightly smaller than the maximum inner radial dimension of the passageway 925 which allows LFE 918 to easily slide in and out of the passageway 925. To secure the LFE 918 properly without interfering with the laminar flow through the channel, the LFE 918 is provided with expansion means which radially expands at least a portion of the LFE 918 and applies force to the inner walls of the passageway 925 securing the LFE in place. Unlike the prior art, an assembler can secure a LFE through radial expansion of an end of the LFE at room temperature.

In FIGS. 9A, 9B, and 9C, one preferred embodiment is shown in which expansion means can secure the LFE 918 in a passageway 925 without interfering with the flow of fluid through the channel. In this embodiment one of the end segments of the LFE 918 has an opening or bore 942 deep enough to form two wedge elements on its opposite sides. These wedge elements may be separated sufficiently to allow the outer surfaces of the wedge elements to grip the inner surface of the passageway 925 of the bypass section. The expansion means which moves the two wedge elements apart can be any type of wedging device, such as pin 944 shown in FIGS. 9A and 9B, or a ball described hereinafter in connection with FIGS. 10A, 10B and 10C. The pin 944 has a slightly larger diameter than the diameter of the bore 942 and is sized so that it can be forced into the bore 942 so as to force the wedge elements apart so that the wedge elements firmly grip the inner wall of the passageway 925 and sufficiently, securely mount the LFE 918 in the passageway 925. This means for expanding the ends is advantageous because an assembler can more easily remove the LFE 918 than the prior art LFEs. A tool can be designed to easily remove and insert expansion means.

Both ends of the LFE 918 can be provided with expandable means, or alternatively, as shown in FIG. 9A, 9B and 9C one expandable end 920 and one non-expandable end 922 can be provided. The non-expandable end 922 of the LFE 918 shown in the drawings is preferably provided with a reduced diameter section 950, the very tip 952 of which is tapered. The tip 952 is also provided with at least one slot 956 for providing a fluid connection between the channel created by the LFE and the remaining downstream portion of the passageway when the LFE is properly positioned in the passageway. The passageway is augmented or chamfered to form the bevel portion 954 so that the tapered tip 952 abuts bevel portion 954 when the LFE is moved into its proper position of the passageway 925. In its proper position, a sufficient opening is provided by the slot 956 to allow fluid to flow past the LFE and out of the bypass section.

The invention also embodies an LFE where an expandable end, similar to end 920, replaces the non-expandable end 922. In this embodiment, the passageway is preferably not augmented by reducing its diameter at the non-expandable end, but has substantially the same diameter throughout. Engaging the expansion means at both ends secures the LFE to the passageway, wherein the wedged elements separate and grip the inner surface of the passageway.

FIGS. 10A, 10B and 10C show another LFE wedge element which provides sufficient radial pressure to lodge the LFE 1018 in the passageway 1025. In the embodiment shown, the ball 1046 shown in Figure 10B engages socket 1048 at least at one end of the LFE. The insertion of the ball 1046 causes the portions of the socket to spread apart and apply pressure to the inner surface of the passageway 1025. The pressure against the inner surface of the passageway 1025 secures the LFE 1018 within the bypass. The non-expanding end 1022 has a reduced diameter section 1050 which is preferably tapered at the tip 1052. As in FIGS. 9A, 9B and 9C, the passageway is augmented so as to form the bevelled portion 1054 so that the LFE will be correctly positioned at the end 1022 when the tip abuts the portion 1054. Similarly, one or more slots 1056 are provided in the tip 1052 so as to provide fluid communication between the channel and the downstream portion of the passageway. While the FIGS. 10A, 10B and 10C show a single ball and socket arrangement for securing the LFE in place, the scope of the present invention includes utilization of a dual ball and socket arrangement, located at both ends of the LFE 1018. As in the embodiment shown in FIGS. 9A, 9B and 9C, a special tool can insert and remove ball 1046 from the opening 1048.

While the invention has been discussed in connection with flowmeters that measure mass flow by measuring the difference in heat conducted away from heater coils 114, 116, those skilled in the art will appreciate that the invention embraces other types of flowmeters as well. For example, flowmeters using one sensor coil, and those using three sensing coils can utilize any of the aspects of the present invention. In addition, pressure based flowmeters may be constructed according to any of the aspects of the invention. For example, a pressure based flowmeter of the type that measures the difference in fluid pressures downstream of the LFE is described in co-pending U.S. patent application Ser. No. 08/682857 filed on Jul. 12, 1996 in the names of James Loan, John LeFavour, D. Jeffrey Lischer, Laura A. Sullivan and David Planchard, and entitled IMPROVED PRESSURE-BASED MASS FLOW CONTROLLER (Attorney's Docket No. MKS-38), the application being incorporated herein by reference.

Figure 11:
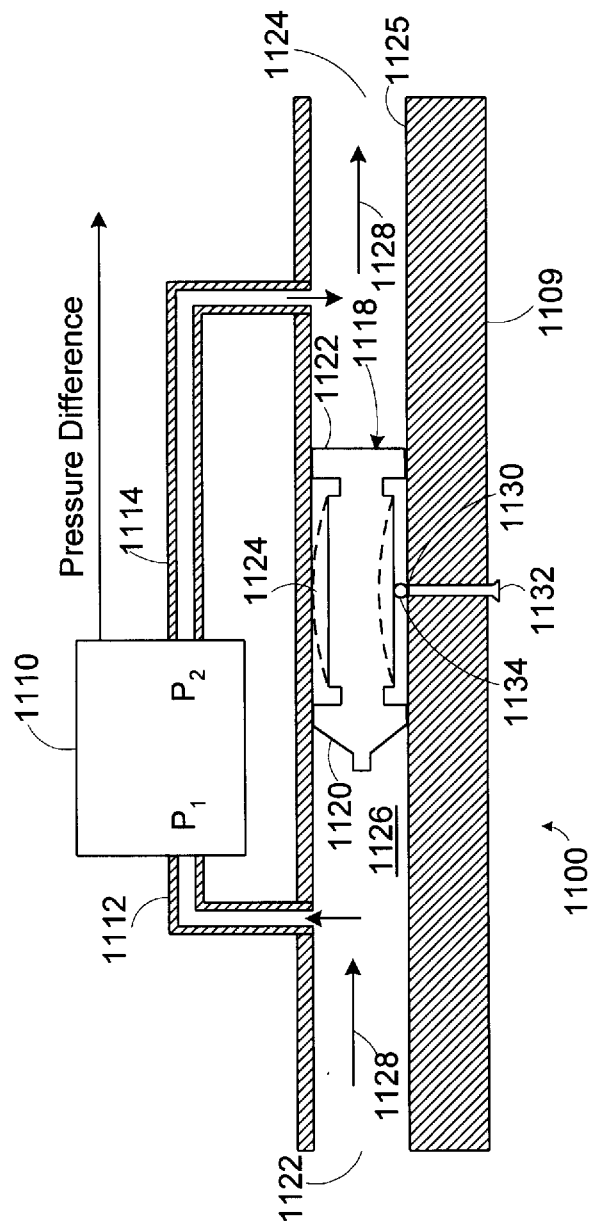
FIG. 11 shows a side view, taken partially in cross section and shown partially in schematic form, of another mass flowmeter constructed according to the invention.

FIG. 11 shows one embodiment of such a pressure based mass flowmeter 1100 constructed according to the invention. Flowmeter 1100 includes bypass section 1109, an LFE 1118 (which is made in accordance with one or more of the improvements described herein, and is shown for illustration purposes to be similar to LFE 518 of FIGS. 5A, 5B and 5C), as well as a differential pressure transducer 1110 and sensor tubes 1112, 1114. Transducer 1110 includes two input ports P1, P2, and transducer 1110 generates an output signal representative of the difference in the fluid pressures at ports P1 and P2. Sensor tube 1112 couples port P1 to a point of bypass section 1110 between input port 1122 and LFE 1118, and sensor tube 1114 couples port P2 to a point of passageway of bypass section 1118 between LFE 1118 and output port 1124. The fluid pressure upstream of LFE 1118 is thus provided to port P1, while the fluid pressure downstream of LFE 1118 is provided to port P2. Transducer 1110 generates its output signal so that it is representative of the difference in fluid pressures upstream and downstream of LFE 1118, and as those skilled in the art will appreciate, this pressure difference is representative of the mass flow rate of fluid through the passageway of bypass section 1109.

Although the various aspects of the invention has been described in connection with particular types of flowmeters, the principles can be applied to any type of flowmeter, as well as any other type of device using a LFE to provide laminar flow of a fluid through a passageway.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. An apparatus comprising:
   (A) an input port;
   (B) an output port;
   (C) means for defining a passageway extending between the input port and the output port, at least a portion of the passageway including an inner surface and being characterized by an inner maximum cross sectional dimension;
   (D) a laminar flow element characterized by an outer maximum cross sectional dimension smaller than said inner maximum cross sectional dimension; and
   (E) means for mounting said laminar flow element within said portion of said passageway so that said laminar flow element remains substantially stationary relative to said passageway and at least a portion of said laminar flow element contacts at least a portion of said inner surface,
   wherein said means for defining a passageway includes a first tube, said apparatus further including a second tube having first and second ends, said second tube first end being coupled to said first tube between said input port and said laminar flow element, said second tube second end being coupled to said first tube between said laminar flow element and said output port, wherein a portion of a fluid flowing from said input port to said output port flows through said second tube, wherein the ratio of the portion of fluid flowing through the second tube to the portion of the fluid flowing through the first tube is a function of the respective inner diameters of said first tube and said second tube, and the outer diameter of said laminar flow element.

2. An apparatus according to claim 1, further including means for measuring the mass flow rate of a fluid flowing from said input port to said output port.

3. An apparatus according to claim 2, wherein said means for measuring the mass flow rate of a fluid flowing from said input port to said output port includes first heater means for heating a first portion of said second tube, second heater means for heating a second portion of said second tube, and means for measuring a temperature difference between said first and second heater means, said temperature difference being indicative of a mass flow rate of said fluid flowing through said second tube.

4. A mass flow metering system comprising:
   (A) an input port;
   (B) an output port; and
   (C) means for defining a bypass channel between the input port and the output port such that the channel has a geometrically-opened cross section, wherein said geometrically-opened cross-section is crescent-shaped.

5. A mass flow metering system comprising:
   (A) an input port;
   (B) an output port; and
   (C) means for defining a bypass channel between the input port and the output port such that the channel has a geometrically-opened cross section, wherein said geometrically-opened cross-section is L-shaped.

6. An apparatus comprising:
   (A) an input port;
   (B) an output port;
   (C) means for defining a passageway extending between the input port and the output port and defining the direction of the flow of a fluid between the input and output ports;
   (D) a laminar flow element disposed within said passageway so as to define a channel within said passageway between at least a portion of said laminar flow element and said means for defining said passageway; and
   (E) adjustment means for selectively displacing at least said portion of said laminar flow element in a second direction, transverse to said direction of the flow of fluid, between a first position wherein the cross sectional shape of the channel is of a first configuration, and a second position wherein the cross sectional shape of the channel is of a second configuration different from said first configuration.

7. An apparatus according to claim 6, wherein said passageway is cylindrical in cross section.

8. An apparatus according to claim 7, wherein said laminar flow element is cylindrical in cross section.

9. An apparatus according to claim 8, wherein said laminar flow element contacts at least a portion of an inner surface of said passageway when said laminar flow element is disposed in one of said first and second positions.

10. An apparatus according to claim 6, wherein said second direction is substantially perpendicular to said direction of the flow of fluid.

11. An apparatus according to claim 6, wherein means for defining said passageway includes at least one aperture, and said adjustment means comprises at least one adjustable screw extending through said at least one aperture for selectively displacing at least said portion of said laminar flow element in said second direction.

12. An apparatus according to claim 6, wherein said laminar flow element includes a first segment coupled to said portion of said laminar flow element, said first segment including (a) means for holding said first segment substantially stationary within said passageway, independent of said adjustment means, and (b) means for defining a gap within said passageway for allowing fluid to flow past said first segment.

13. An apparatus according to claim 12, wherein said means for holding said first segment includes a first anchor portion sufficiently large to secure said first segment in said passageway.

14. An apparatus according to claim 12, wherein said laminar flow element includes a second segment coupled to said portion of said laminar flow element, said portion of said laminar flow element being disposed between said first and second segments, said second segment including (a) means for holding said second segment substantially stationary within said passageway, independent of said adjustment means, and (b) and means for defining a gap within said passageway for allowing fluid to flow past said second segment.

15. An apparatus according to claim 14, wherein said means for holding said second segment includes a second anchor portion sufficiently large to secure said second segment in said passageway.

16. An apparatus according to claim 15, wherein said portion of said laminar flow element is resiliently coupled to said first and second segments.

17. An apparatus according to claim 6, wherein said portion of said laminar flow element is resilient.

18. An apparatus according to claim 6, further including means for measuring the rate of mass flow of fluid flowing from said input port to said output port.

19. An apparatus according to claim 6, further including means for defining a second passageway having a fluid inlet and a fluid outlet, said means for defining said second passageway being coupled to said means for defining said first passageway such that said fluid inlet of the second passageway is in fluid communication with said first passageway between said input port and said laminar flow element, and said fluid outlet of said second passageway is in fluid communication with the first passageway between the laminar flow element and the output port, and a portion of a fluid flowing from said input port to said output port flows through said second passageway in accordance with a splitting ratio determined as a function of relative dimensions of said laminar flow element and said first passageway.

20. An apparatus according to claim 19, further including first heater means for heating a first portion of said second passageway to a first temperature in the absence of flow of fluid through said second passageway, second heater means for heating a second portion of said second passageway to a second temperature in the absence of flow of fluid through said second passageway, and means for measuring the temperature difference between said first and second heater means as fluid flows through said second passageway, wherein said temperature difference is representative of the flow rate of the mass of a fluid flowing through said second passageway.

21. An apparatus according to claim 6, further including means for measuring the pressure difference between a first fluid pressure at a location between said input port and said laminar flow element and a second fluid pressure at a location between said laminar flow element and said output port, said pressure difference being representative of a flow rate of mass of a fluid flowing from said input port to said output port.

22. An apparatus, comprising:

(A) an input port;

(B) an output port;

(C) means for defining a passageway extending between the input port and the output port and defining the direction of the flow of a fluid between the input and output ports;

(D) a laminar flow element having a first support segment, a second support segment, and a central segment disposed between said first and second support segments and movable relative to the support segments, wherein said laminar flow element is disposed within said passageway, each of said first and second support segments includes (a) means for holding said support segment substantially stationary relative to said passageway, and (b) means for defining a gap within said passageway for allowing fluid to flow past said support segment, said central segment is configured so as to define a channel within said passageway between the central segment and the means for defining the passageway; and (E) adjustment means for displacing the central segment of said laminar flow element relative to the means for defining the passageway and the support segments, between a first position wherein the cross sectional shape of the channel is of a first configuration, and a second position wherein the cross sectional shape of the channel is of a second configuration different from said first configuration.

23. An apparatus, comprising:

(A) an input port;

(B) an output port;

(C) means for defining a passageway extending between the input port and the output port and defining the direction of the flow of a fluid between the input and output ports; and (D) a laminar flow element adapted to slide into and out of said passageway, and having support means adapted to radially expand within the passageway so as to secure said laminar flow element within the passageway when said laminar flow element is satisfactorily positioned within the passageway.

24. Apparatus according to claim 23, wherein said laminar flow element includes a first support segment, a second support segment, and a central segment disposed between said first and second support segments, each of said first and second support segments includes means adapted to radially expand at least a portion of each of said support segments so as to secure said laminar flow element within the passageway.

25. Apparatus according to claim 24, wherein said first and second support segments are end segments.

26. Apparatus according to claim 24, wherein each of said support segments each includes wedge elements, and said means adapted to radially expand at least a portion of each of the support segments includes means for insertion between said wedge elements of each support segment so as to radially expand said wedge elements.

27. Apparatus according to claim 26, wherein said means for insertion between said wedge elements of each support segment so as to radially expand said wedge elements includes a pin.

28. Apparatus according to claim 26, wherein said means for insertion between said wedge elements of each support segment so as to radially expand said wedge elements includes a ball.

* * * * *